United States Patent [19]

Koizumi et al.

[11] 4,282,860
[45] Aug. 11, 1981

[54] HOT AIR TYPE SOLAR HEAT-COLLECTING APPARATUS

[75] Inventors: Hisao Koizumi, Zushi; Yoshinosuke Kawada; Koichi Matsui, both of Yokohama, all of Japan

[73] Assignee: Tokyo Shibaura Electric Co., Ltd., Kawasaki, Japan

[21] Appl. No.: 98,593

[22] Filed: Nov. 29, 1979

Related U.S. Application Data

[63] Continuation of Ser. No. 863,037, Dec. 21, 1977, abandoned.

[30] Foreign Application Priority Data

Dec. 23, 1976 [JP] Japan .................. 51-154263

[51] Int. Cl.³ .................................. F24J 3/02
[52] U.S. Cl. ....................... 126/429; 126/449; 126/445; 126/450
[58] Field of Search ............... 126/429, 431, 444, 445, 126/446, 449, 450, 417; 165/168, 170, 171, 173

[56] References Cited

U.S. PATENT DOCUMENTS

| | | | |
|---|---|---|---|
| 2,907,318 | 10/1959 | Awot | 126/446 |
| 3,994,276 | 11/1976 | Pulver | 126/431 |
| 3,997,108 | 12/1976 | Mason | 126/429 |
| 4,026,268 | 5/1977 | Bartos et al. | 126/445 |
| 4,048,981 | 9/1977 | Hobbs | 126/423 X |
| 4,051,999 | 10/1977 | Granger et al. | 126/400 |
| 4,062,346 | 12/1977 | Rapp, Jr. | 126/449 |
| 4,089,324 | 5/1978 | Tjaden | 126/445 X |
| 4,141,338 | 2/1979 | Lof | 126/449 |
| 4,219,012 | 8/1980 | Bergen | 126/449 |

FOREIGN PATENT DOCUMENTS 2309810 11/1976 France .................. 126/449

Primary Examiner—James C. Yeung
Assistant Examiner—Larry Jones
Attorney, Agent, or Firm—Oblon, Fisher, Spivak, McClelland & Maier

[57] ABSTRACT

A hot air type solar heat-collecting apparatus comprises a first transparent plate, a second transparent film located thereunder, and a corrugated metal plate mounted on the underside of a second transparent film to absorb the sunlight. The metal plate forms a first group of air passages on the upperside thereof and a second group of air passages on the underside thereof.

9 Claims, 8 Drawing Figures

HOT AIR TYPE SOLAR HEAT-COLLECTING APPARATUS

This is a continuation of application Ser. No. 863,037 filed Dec. 21, 1977.

BACKGROUND OF THE INVENTION

This invention relates to a hot air solar heat-collecting apparatus used with a room-heating system based on solar heat.

In recent years, the so-called solar house has been developed which is provided with a solar heat-collecting apparatus, thereby heating rooms by solar heat accumulated in said solar heat-collecting apparatus with air used as a heat-transferring medium.

The known solar heat-collecting apparatus is the type which comprises a black-painted heat-collecting plate of high heat conductivity formed of, for example, a sheet of aluminium or copper or a zinc-plated steel sheet, a transparent plate made of, for example, glass and mounted on said heat-collecting plate, and an air passage extending along the underside of said heat-collecting plate.

According to the prior art solar heat-collecting apparatus set forth, for example, in the U.S. Pat. No. 4,019,494, a large number of fins are erected on the underside of the solar heat-collecting plate, and air conducted between the fin assembly and a heat-insulating member disposed below said fin assembly is heated by the solar heat-collecting plate. However, this proposed solar heat-collecting apparatus had the drawback that solar heat was collected inefficiently, failing fully to heat rooms.

SUMMARY OF THE INVENTION

It is accordingly the object of this invention to provide a hot air type solar heat-collecting apparatus of simple construction which has a prominent heat-collecting efficiency and admits of easy assembly and installation.

DETAILED DESCRIPTION OF THE PREFERRED EMBODIMENT

There will now be described by reference to the accompanying drawings a solar heat-collecting apparatus embodying this invention.

Figure 1:
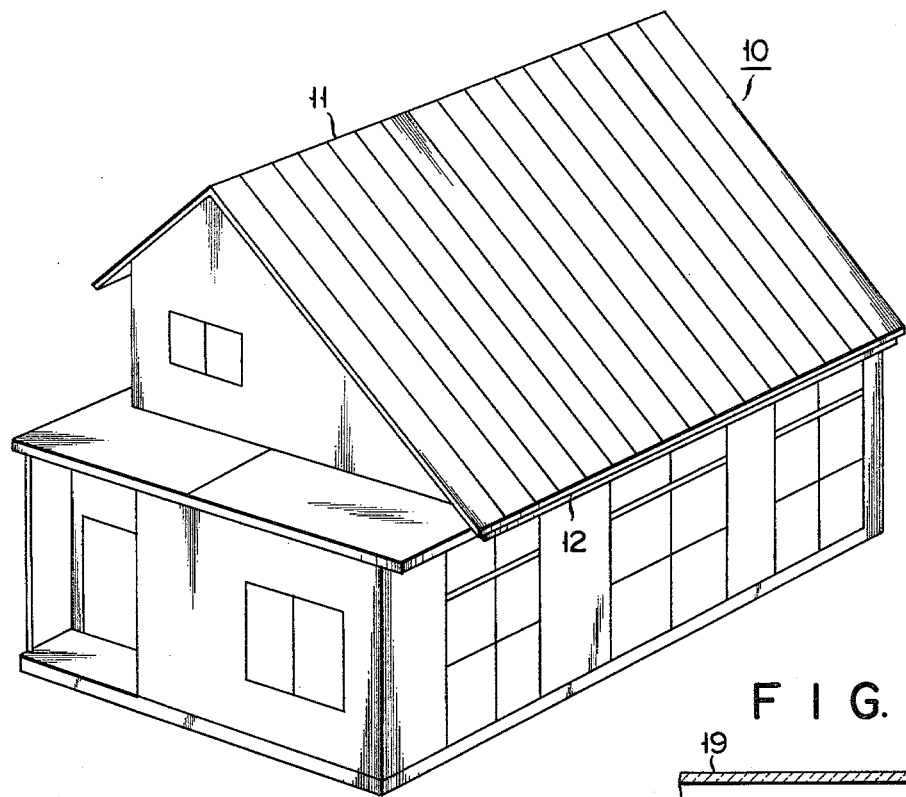
FIG. 1 is an oblique view of a solar house, part of whose roofing itself is built of a solar heat-collecting apparatus embodying this invention.
Figure 2:
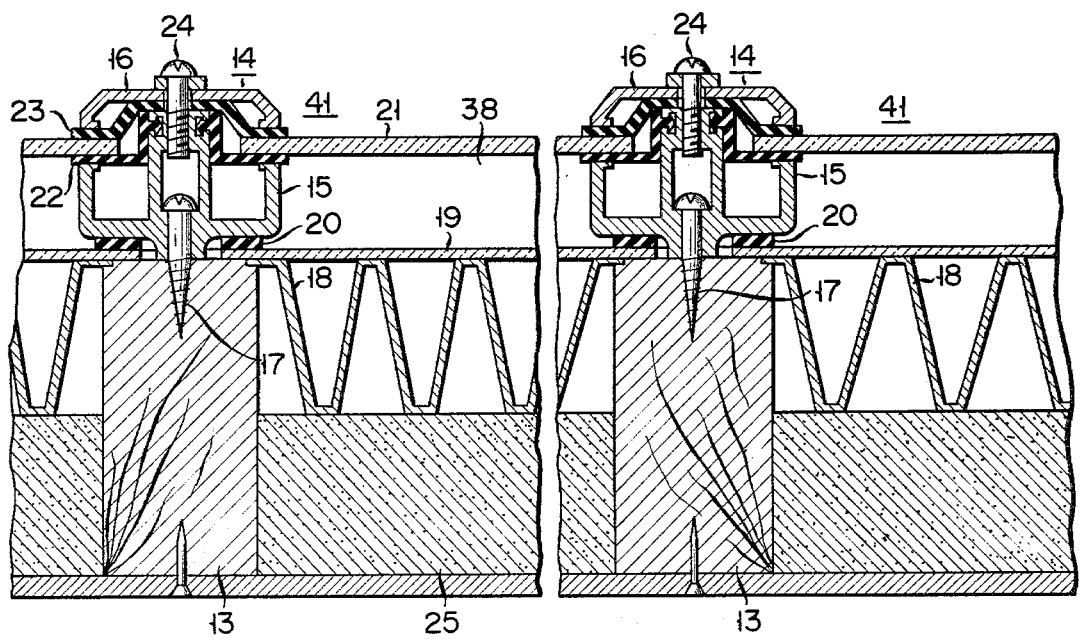
FIG. 2 is a fractional sectional view of the roofing of the solar house of FIG. 1.

FIG. 1 shows the so-called solar house, part of whose roofing 10 itself is built of a hot air type solar heat-collecting apparatus. With the embodiment of FIG. 1, the southern inclined plane of the roofing 10 is wholly built of a solar heat-collecting apparatus. This solar heat-collecting apparatus comprises a large number of heat-collecting apparatus units 41 (FIG. 2) extending from the ridge 11 to the eaves 12 of the roofing 10. As seen from FIG. 2, each heat-collecting apparatus unit 41 is positioned between every two adjacent ones of a plurality of parallel rafters 13 extending from the ridge 11 to the eaves 12 of the roofing 10. The heat-collecting apparatus unit 41 is secured to the rafters 13 by fixing means 14 comprising an upper support mechanism 16 and a lower support mechanism 15 both extending along the rafter 13 and made of an aluminium plate. The lower support mechanism 15 comprises a base portion secured to the rafter 13 by a screw 17 and a keep plate which horizontally extends from both sides of the base plate and whose extending end portions are bent upward from the base plate at an angle of approximately 90°. Where the lower support mechanism 15 is fitted to the rafter 13 by the screw 17, both lateral edge portions of a heat-collecting plate 18 which is crosswise corrugated are placed on the corresponding rafters 13. Said lateral edge portions are pressed downward by the keep plate of the lower support mechanism 15 with packing 20 and the later described transparent plate or film 19 interposed between said lateral edge portions and keep plate. The corrugated heat-collecting plate 18 is formed of a black-painted thin metal sheet which is made wider than a space between two adjacent rafters 13 and substantially as long as the rafter 13.

The transparent film 19 is formed of a single seamless strip of plastics material to permit the passage of sunlight and is made as long as a distance between the ridge 11 and the eaves 12 of the roofing 10 and slightly wider than the heat-collecting plate 18. The transparent film 19 is disposed on the underside of the packing 20 and is fixed thereby together with the heat-collecting plate 18 when it is securely set in place by the screw 17.

Figure 3:
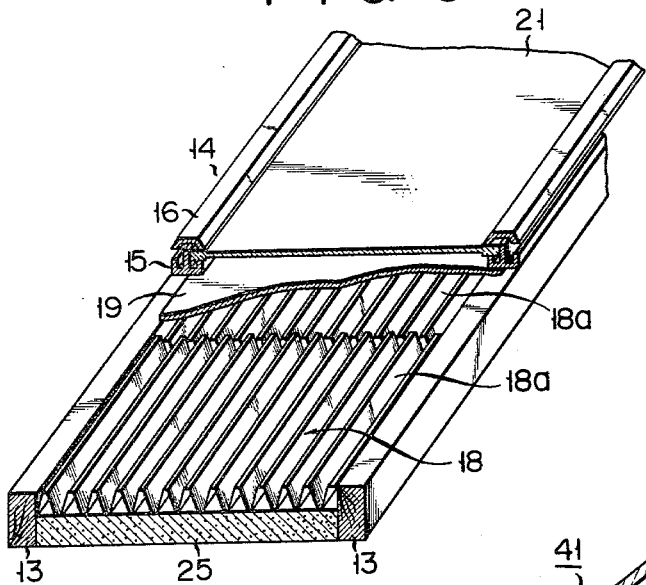
FIG. 3 is an oblique view, partly in section, of a solar heat-collecting apparatus according to the above-mentioned embodiment.

The upper support mechanism 16 comprises a base secured to the base of the lower support mechanism 15 by means of a screw 24 and a keep plate which extends from both sides of the base of said upper support mechanism 16 in a substantially horizontal direction, and whose extending end portions are bent downward at an angle of approximately 90°, thus facing the extending end portions of the lower support mechanism 15. The lateral edge portion of another transparent plate 21 is clamped between the mutually facing extending end portions of the upper support mechanism 16 and lower support mechanism 15 by means of intervening packings 22, 23 and is tightly set in place by the screw 24. This transparent plate 21 is made of a single seamless strip of plastics material or glass to permit the efficient passage of sunlight. Preferably, the previously described lower transparent film 19 should be made of plastics material and the upper transparent plate 21 should be formed of glass. Both transparent film and plate 19, 21 define an air layer for insulating heat. The heat-collecting plate 18 is turned in a trapezoid wave form. The crest of the ridge of the plate is contacted with the underside of the lower transparent film 19. The upper face of the corrugated heat-collecting plate 18 and the lower side of the transparent film 19 define a first group of independent air passages. The root sections of the corrugated heat-collecting plate 18 are contacted with a heat-insulating and air-sealing layer 25 which is prepared from heat-insulating material and provided in the lower part of a space between adjacent rafters 13. The lower face of the corrugated heat-collecting plate 18 and an aluminium foil covered on the heat-insulating and air-sealing layer 25 constitute a second group of independent air passages. With the respective heat-collecting apparatus units 41 vertically arranged between every two adjacent rafters 13, the corrugated form of a given heat-collecting plate unit 18a is displaced crosswise by half pitch from that of the upper and lower adjacent heat-collecting plate units 18a as shown in FIG. 3. Therefore, the inclined planes of said given corrugated heat-collecting plate unit 18a are prevented from being vertically aligned with those of the upper and lower adjacent heat-collecting plate units 18a. The air passages of said given heat-collecting plate unit 18a are not aligned with those of the upper and lower adjacent heat-collecting plate units 18a, causing part of an air stream running through the air passages of said given heat-collecting plate unit 18a to be diverted into the air passages of the adjacent heat-collecting plate units 18a. Therefore, air is conducted through the air passages of the respective heat-collecting plate units 18a in the form of turbulent streams, enabling heat to be transferred through the air more efficiently.

Figure 4:
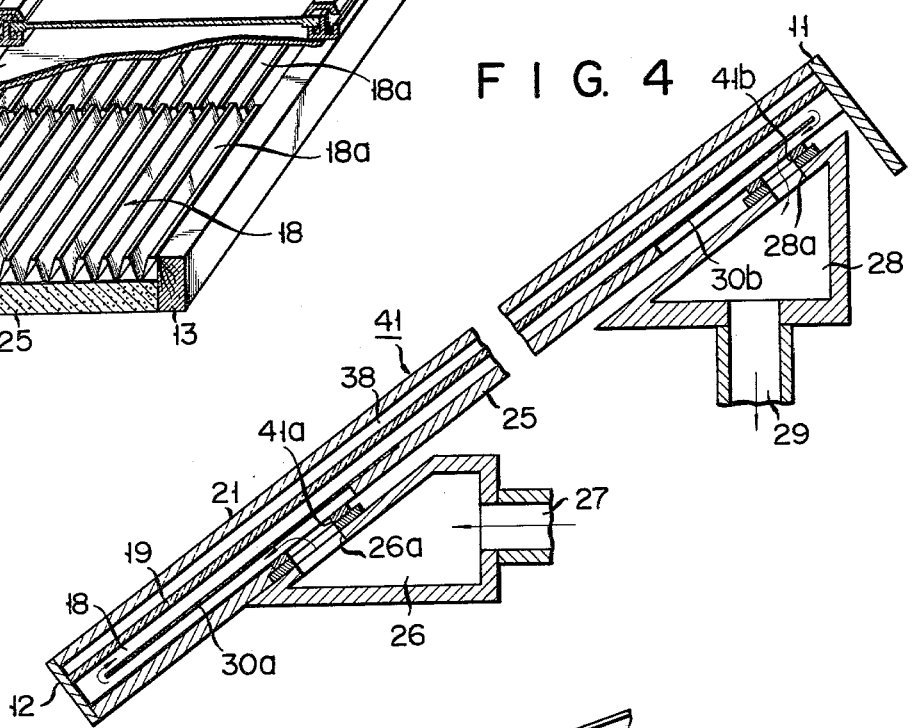
FIG. 4 is a schematic sectional view of the roofing of the solar house of FIG. 1.
Figure 5:
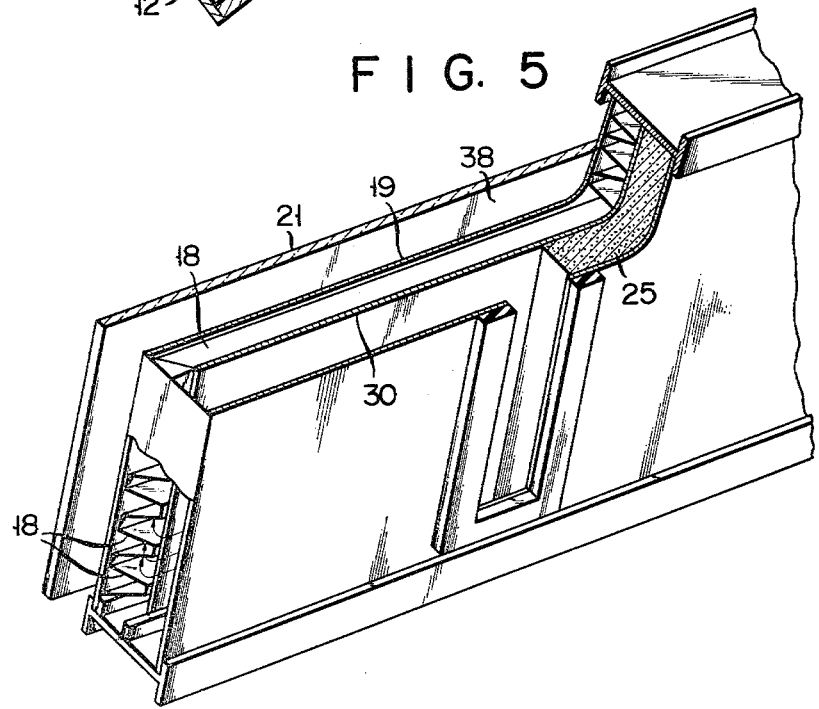
FIG. 5 is an oblique view, partly in section, of a solar heat-collecting apparatus according to said embodiment.

The heat-collecting apparatus units 41 of the above-mentioned construction are supplied with air conducted through and heated by the mechanism indicated in FIGS. 4 and 5. Referential numeral 26 of FIG. 4 denotes an air-distributing chamber which extends along the underside of the eaves 12 slightly inside thereof and is provided with a plurality of openings 26a communicating with the air inlet ports 41a of the respective heat-collecting apparatus units 41 to supply said units 41 with air conducted through a duct 27. Referential numeral 28 shows an air-collecting chamber, which extends along the underside of the ridge 11 of the roofing 10 slightly inside thereof, and is provided with a plurality of openings 28a communicating with the air outlet ports 41b of the respective heat-collecting apparatus units 41 to conduct hot air collected from said apparatus units 41 into the rooms of a solar house through a duct 29.

The air-distributing chamber 26 and air-collecting chamber 28 having a relatively large volume are built under the roofing 10 over the surface of the ceiling of a solar house and do not project out of the roofing 10, thus tending to little obstruct the attractiveness of the solar house as a whole. Air supplied from the air-distributing chamber 26 is carried, as shown in FIG. 4, to the backside of a partition plate 30a extending along the heat-insulating layer 25. The air makes a U-turn at the outermost end portion of the eaves 12 of the roofing 10 to enter the first and second groups of air passages of the lowermost heat-collecting plate unit 18a and is heated by absorbing solar heat delivered from said heat-collecting plate unit 18a. The air thus heated runs upward through a series of heat-collecting plate units 18a, makes a U-turn again at the ridge 11 of the roofing 10 to the backside of a partition plate 30b and is brought into the air-collecting chamber 28 to be supplied to the rooms of a solar house.

Figure 6:
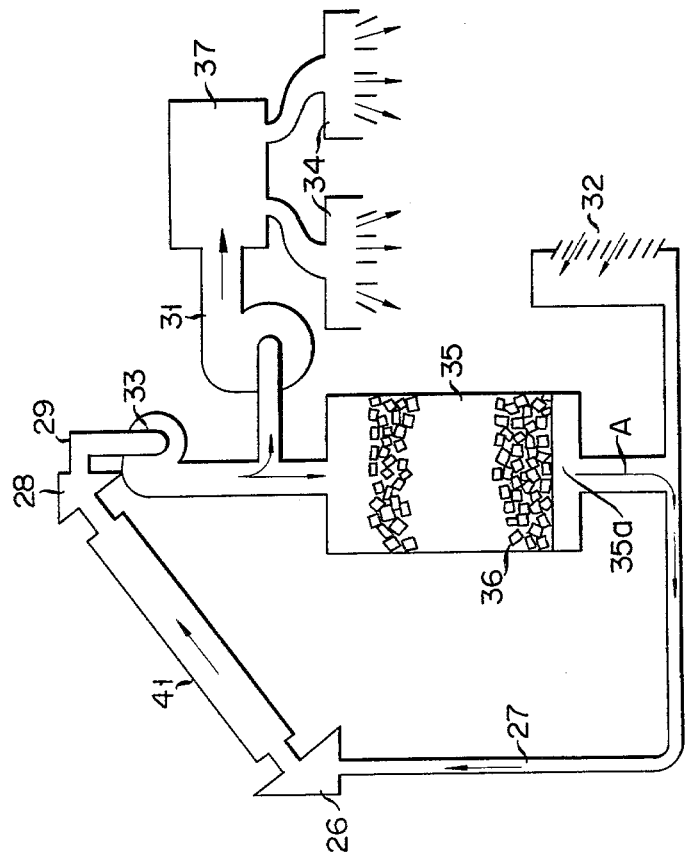
FIG. 6 illustrates an air-circulating system provided for the solar house of FIG. 1.

The air-circulating system of a hot air type heat-collecting apparatus embodying this invention is designed such that, as shown in FIG. 6, indoor air is absorbed at an exhaust port 32 and air in a heat reservoir 35 is sucked at an exhaust port 35a, by the rotation of blowers 31, 33 and conducted to the air-distributing chamber through the duct 27 to be distributed into the respective heat-collecting apparatus units 41 through the air-distributing chamber 26. The heat-collecting plates 18 of the present solar heat-collecting apparatus are heated by sunlight. Air heated hot by flowing through the first and second groups of air passages of the respective heating plate units 18a is brought into the air-collecting chamber 28. The hot air is sent forth into the rooms for heating through air inlet ports 34 by means of blowers 33, 31. Part of the hot air supplied from the blower 33 is brought into the heat reservoir 35. The heat of the hot air is retained by a large number of crushed stones 36 received in the heat reservoir 35. Where, in wet weather, or during night time the blower 33 is stopped and only the blower 31 is operated, then circulating air is taken in at the suction port 32 to be brought into the heat reservoir 35, where the air is heated by absorbing heat already preserved therein. The air thus heated is discharged into the rooms through a plurality of outlet ports 34. Further provided between the blower 31 and air outlet ports 34 is a plenum duct 37 for uniformly distributing hot air to said plural air outlet ports 34.

Figure 7:
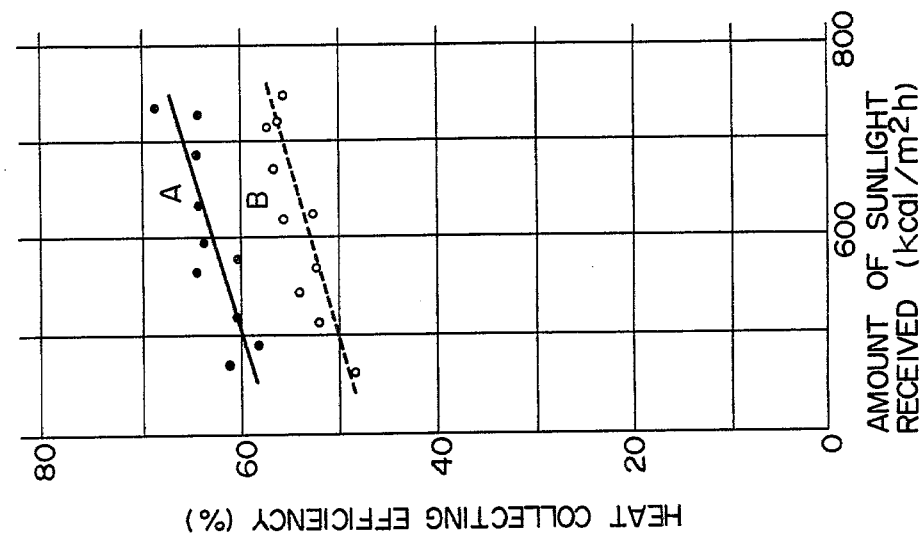
FIG. 7 graphically shows the results of measuring the heat-collecting efficiency of the prior art solar heat-collecting apparatus and that of a solar heat-collecting apparatus embodying this invention.

FIG. 7 sets forth the results of measuring the unit area heat-collecting efficiency of the heat-collecting plate used in the hot air type solar heat-collecting apparatus embodying this invention and that used in the prior art solar heat-collecting apparatus in which the underside of the respective heat-collecting plates was provided with fins. The measurement was made under the condition in which air was run through both apparatuses at the same flow rate. Referring to FIG. 7, an amount of sunlight ($kcal/m^2h$) received is plotted on the abscissa, and a heat-collecting efficiency (%) is shown on the ordinate. The solid line A denotes the heat-collecting efficiency of the present solar heat-collecting apparatus, and the broken line B represents that of the conventional solar heat-collecting apparatus. FIG. 7 proves that the solar heat-collecting apparatus of this invention increases about 10% in heat-collecting efficiency over the prior art solar heat-collecting apparatus.

The above-mentioned, higher heat-collecting efficiency of this invention results from the fact that the respective heat-collecting plates are corrugated to increase an area for substantially absorbinfg solar heat, a lower transparent plate or film is mounted on each corrugated heat-collecting plate to provide independent air passage on the upper and lower sides of said corrugated heat-collecting plate for effective absorption of heat generated in said heat-collecting plate; and an upper transparent plate or film is positioned above said lower transparent plate, thereby minimizing loss of heat from the air passages formed under the lower transparent plate. Greater corrugation of the heat-collecting plate well serves the purpose, making it unnecessary to fit fins to the heat-collecting plate with the resultant decrease in the weight of a solar heat-collecting apparatus.

With the foregoing embodiment, two transparent plates or films were used. However, it is possible to interpose some other transparent plates between said two plates. Further, these transparent plates need not be flat. The lower transparent plate can be easily prepared with light weight and in the elongate form from plastics material such as polyester or polycarbonate. Moreover, it is unnecessary to cause the lower transparent plate to be pressed against or contacted with the crests of the ridges of the corrugated heat-collecting plate.

The aforesaid embodiment used a heat-collecting plate which was corrugated in the trapezoidal form. However, it is possible to apply a heat-collecting plate corrugated in any other form, for example, a sine wave, rectangular wave or triangular wave.

Figure 8:
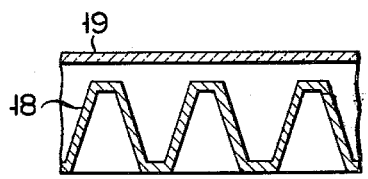
FIG. 8 shows a sectional view of the part of a modified solar heat-collecting apparatus.

FIG. 8 shows an alternate embodiment wherein the crests of ridges of the heat-collecting plate are disposed apart from transparent film 19.

What is claimed as new and desired to be secured by Letters Patent of the United States is:

1. A hot air type solar heat-collecting apparatus for heating a room comprising:
   a transparent plate permeable to sunlight;
   a transparent plastic film which spatially faces the plate and is permeable to sunlight passing through the plate;
   an air-sealing layer spatially facing the opposite side of the transparent film to the transparent plate;
   a heat-collecting plate disposed between the transparent film and air-sealing layer in parallel relationship therewith, contacted with the transparent film and air-sealing layer and crosswise corrugated with a large number of ridges and furrows to absorb the heat of the sunlight passing through the transparent film, the transparent plastic film being continuously supported by the heat-collecting plate, which is supported on the air-sealing layer;
   a first group of air passages being defined by one side of the corrugated heat-collecting plate and the transparent film;
   a second group of air passages being defined by the other side of said corrugated heat-collecting plate and air-sealing layer;
   means for circulating air through both groups of air passages in the lengthwise direction of the heat-collecting plate, thereby heating circulating air by the heat delivered from the heat-collecting plate, and
   said means for circulating including a blower for pulling heated air from the air passages for forwarding it into said room such that said transparent plastic film can be continuously supported by the heat-collecting plate.

2. The solar heat-collecting apparatus according to claim 9, wherein the crests of the ridges of the corrugated heat-collecting plate are contacted with the film, and the bottoms of the furrows of the corrugated heat-collecting plate are contacted with the air-sealing layer, thereby rendering the air passages of both groups independent of each other.

3. The solar heat-collecting apparatus according to claim 9, wherein the transparent plate and transparent film are flat and arranged parallel with each other.

4. The solar heat-collecting apparatus according to claim 3, wherein the transparent plate is made of glass.

5. The solar heat-collecting apparatus according to claim 1, wherein the heat-collecting plate is made of metal.

6. The solar heat-collecting apparatus according to claim 5, wherein the heat-collecting plate is corrugated in a trapezoidal form.

7. The solar heat-collecting apparatus according to claim 1, wherein the heat-collecting plate is formed of a plurality of heat-collecting plate units; and the corrugated form of a given one of said plural heat-collecting plate units is crosswise displaced from those of the upper and lower adjacent heat-collecting plate units.

8. The solar heat-collecting apparatus according to claim 1, wherein said heat-collecting plate is of a trapezoidal wave form such that a crest of a ridge portion of said heat-collecting plate contacts said transparent plastic film.

9. The solar heat-collecting apparatus according to claim 1, wherein:
   the heat-collecting plate and the transparent plastic film are in surface-to-surface planar contact with one another.

* * * * *